(12) United States Patent
Laibowitz et al.

(10) Patent No.: US 6,271,076 B1
(45) Date of Patent: Aug. 7, 2001

(54) METHOD FOR FABRICATING A NOVEL METALLIZED OXIDE STRUCTURE

(75) Inventors: Robert Benjamin Laibowitz; Thomas McCarroll Shaw, both of Peekskill; Joseph M. Viggiano, Wappinger Falls, all of NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/289,226

(22) Filed: Apr. 9, 1999

Related U.S. Application Data

(62) Division of application No. 09/168,756, filed on Oct. 8, 1998, now abandoned, which is a division of application No. 08/807,186, filed on Feb. 27, 1997, now Pat. No. 5,926,360
(60) Provisional application No. 60/033,163, filed on Dec. 11, 1996.

(51) Int. Cl.$^7$ .................................................. H01L 21/8242
(52) U.S. Cl. ................................ 438/240; 438/3; 438/396
(58) Field of Search ................................ 438/3, 253, 254, 438/255, 256, 396, 397, 398, 399, 644, 665, 240

(56) References Cited

U.S. PATENT DOCUMENTS 3,830,657 * 8/1974 Farrar .
5,182,232 * 1/1993 Chhabra et al. .
5,409,861 * 4/1995 Choi .

OTHER PUBLICATIONS

IBM Technical Disclosure Bulletin, "Low Leakage, Temperature Invariant, High Dielectric Constant Films, using Multilayered Sol–Gel Fabrication", vol. 37, No. 9, Sep.1994, pp. 27–28.*

* cited by examiner

*Primary Examiner*—Tuan H. Nguyen
(74) *Attorney, Agent, or Firm*—Robert M. Trepp; Anne Vachon Dougherty

(57) ABSTRACT

A structure and method for providing an interface with an oxide surface which exhibits both high adhesion and preferred electrical properties. The method involves providing a partial layer of a first material, chosen for its electrical properties, whereby the partial layer has openings through which areas of the oxide surface are exposed. Provision of the partial layer is followed by deposition of a continuous layer of a second material, selected for its preferred physical interface properties, i.e., adhesion. The continuous layer of the second material is deposited over the partial layer including the exposed areas of the oxide surface. The second material will adhere to the exposed areas of oxide, while the first material will provide a discrete interface with the oxide. An embodiment includes a capacitor structure having one or two electrodes abutting a high dielectric thin film, whereby the electrodes comprise first partial layers of metal having favorable electrical properties and second continuous layers adjacent the first partial layers, with the second layer material having been chosen for its physical properties, and wherein the second material adheres to exposed areas of the thin film through openings in the partial metal layer.

8 Claims, 3 Drawing Sheets

METHOD FOR FABRICATING A NOVEL METALLIZED OXIDE STRUCTURE

This is a division of application Ser. No. 09/168,756 filed Oct. 8, 1998, now abandoned, which was a division application of Ser. No. 08/807,186, filed Feb. 27, 1997, now U.S. Pat. No. 5,926,360, which claimes benefit of Provisional Application Ser. No. 60/033,163 filed Dec. 11, 1996.

FIELD OF THE INVENTION

This invention relates to the fabrication of metallized dielectric structures and more specifically to the fabrication of novel capacitor structures having optimal interface properties coupled with enhanced conductor-to-dielectric adhesion.

BACKGROUND OF THE INVENTION

In the fabrication of integrated circuits, layers of metal or of other conducting materials are deposited onto materials having extremely high dielectric constants to form integrated circuit components. In particular, capacitor structures require a discrete interface between high dielectric materials and the electrode materials in order to exhibit the optimal capacitance. While the discrete interface provides the desirable electrical characteristics, many of the preferred capacitor materials do not adhere well to each other at the interface, causing concern that delamination and failure will occur at the high temperatures encountered during processing and use. In addition, the conducting material should be one which does not react with the dielectric, since such reaction can form an interfacial layer having a lower dielectric constant than the original material. The presence of such an interfacial layer introduces, in effect, another capacitor in series with the intended capacitor, severely degrading the total dielectric constant by reduction of the total capacitance.

Typical integrated circuit capacitors include a lower electrode of one metal or other conducting material deposited on a dielectric substrate, a sandwich layer of the high dielectric material, and an upper electrode of the same or a different conducting material. Conducting materials which are typically used for capacitor electrodes include aluminum, titanium and chromium, preferred for their high conductivity, excellent adhesion properties, and ease of use for connectivity to other levels of circuitry. While such materials have many desirable characteristics, they readily react with dielectrics, forming the harmful interfacial oxide layers. Relatively inert metals, such as platinum and gold, are good electrode conductors which form acceptable interfaces; but, they do not exhibit good adhesion, and are costly to use.

Many varied solutions have been proposed to improve the conductor-to-dielectric interfaces and to overcome the aforementioned problems. Most solutions have concentrated on the interface between the first, lower electrode of a capacitor and the dielectric substrate on which the integrated circuit is formed, wherein adhesion is a singular problem without the attendant concern of maintenance of the electrically discrete interface, since the dielectric constant of the substrate need not be very high. For the interface between the high dielectric constant sandwich layer, preferably a high permittivity insulating thin film, and the electrodes, however, both interface properties and adhesion are concerns.

Proposed solutions include: electrodes comprising conducting layers overlaying seed layers of relatively inert metals; bilayer electrodes consisting of first-deposited adhesion layers with overlaying metal layers; and, metal-oxide interlayers between the high dielectric constant materials and the conductors. All of the approaches which have been proposed, however, suffer from problems of compromised interface integrity, either from the physical or the electrical perspective.

It is therefore an objective of the present invention to provide a novel conductor-dielectric integrated circuit structure, and method for fabrication thereof, which provides long-term interface integrity between the high dielectric material and the conducting material.

Another objective of the invention is to provide a novel conductor-dielectric integrated circuit structure and fabrication method which utilizes minimal amounts of high cost materials.

Still another objective of the invention is to provide a novel conductor-dielectric integrated circuit structure which provides good interface properties while still having preferred conductive materials available for connectivity to successive circuitry.

Yet another objective of the invention is to provide a novel lower cost capacitor structure which has high capacitance value while exhibiting good adhesion at the conductor-dielectric interface.

SUMMARY OF THE INVENTION

These and other objectives are realized by the present invention which provides a structure and method for providing an interface with an oxide surface which exhibits both high adhesion and preferred electrical properties. The method involves providing a partial layer of a first material, chosen for its electrical properties, whereby the partial layer has openings through which areas of the oxide surface are exposed. Establishment of the partial layer is followed by deposition of a continuous layer of a second material, selected for its preferred physical interface properties, i.e., adhesion. The continuous layer of the second material is deposited over the partial layer including the exposed areas of the oxide surface. The second material will adhere to the exposed areas of oxide, while the first material will provide a discrete interface with the oxide.

For integrated circuit capacitors having electrodes abutting a thin film of high dielectric constant material, the electrodes comprise first and second conductors. The first conductor, preferably comprising a relatively inert metal, is provided in a thin, partial layer adjacent the surface of the dielectric material. A continuous layer of a different conductor, exhibiting good adhesive properties, is then deposited contacting the partial layer of the first conductor and the exposed dielectric. The latter conductor of the continuous layer adheres to the areas of exposed dielectric to form strong pockets of adhesion, which are sufficient to maintain the physical integrity of the interface. The second conductor layer provides not only the structural adhesive strength but can also provide the preferred connectivity conductor at the top surface of the upper electrode of the capacitor structure, while the first material in the thin discontinuous layer provides the desired electrical properties so that the overall capacitance of the structure is optimal, and is improved over that of prior art structures having single, continuous layers of reactive metal.

DESCRIPTION OF THE PREFERRED EMBODIMENT

When depositing thin metal films on insulator surfaces, initially an array of disconnected clusters of the metal forms on the surface, until the thickness is sufficient to connect the clusters into a continuous layer. Conductivity in the array of clusters is, however, observed well in advance of the time at which complete coverage of the surface is observed. That transition at which the array becomes conducting is referred to as the metal-insulator transition or percolation threshold for the metal, and can be observed when the surface is about 50% covered with the metal.

Figure 1:
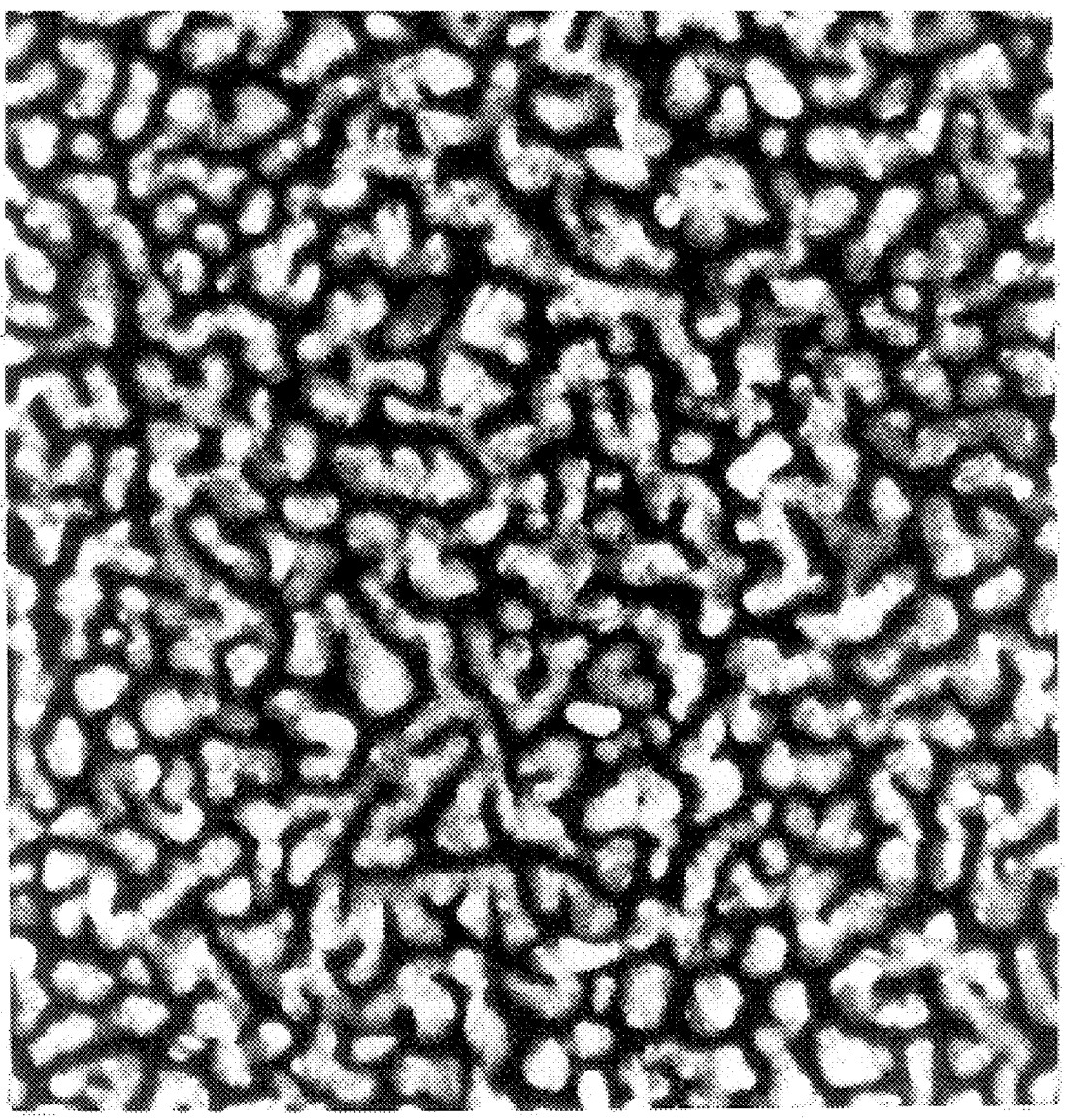
FIG. 1 provides a transmission electron micrograph of a partial layer of gold.

FIG. 1 is a transmission electron micrograph showing clusters of gold deposited by evaporation on a $Si_3N_4$ layer supported by a Si substrate. From the Figure, one can observe a loosely-connected array of darkened clusters of gold formed on the light-toned insulator surface. At a deposition rate of 0.5 nm/second at a base pressure of $2\times10^{-7}$ torr, with deposition thickness of less than 10 nm, the incomplete or partial gold layer becomes conducting at about 50% surface coverage. The gold layer could be said to be spatially discontinuous up to the point of approximately 92% coverage, beyond which the metal layer effectively becomes more and more continuous, which may be several tens of nanometers in thickness.

Substrate temperature, substrate cleanliness, substrate quality, deposition processes, and deposition rates all may play a role in determining the exact thickness at which complete coverage occurs, with cluster growth occurring over a wide range of these parameters. With well-known thin film deposition techniques such as evaporation, sputtering, chemical vapor deposition, molecular beam epitaxy, electroplating, and other controllable thin film deposition technique, excluding bulk film techniques such as spraying or rolling, the cluster growth can be monitored to optimize the thickness and surface coverage of the metal.

What is proposed for the present invention is to deposit a partial layer of metal, such as is shown in FIG. 1, onto the surface of the dielectric material. The non-continuous, or partial, metal layer, having clusters of metal interrupted by exposed areas of the underlying surface, provides the desired electrical interface with the dielectric material. Onto the partial layer of metal and the exposed surface of the underlying dielectric is deposited a continuous layer of a second conductor, selected from conducting materials which have adequate electrical properties and which adhere well to the underlying material. It is to be noted that the present invention could also be utilized to make contact to certain non-insulators such as semiconductors and superconductors including high $T_c$ cuprates (e.g., yttrium barium copper oxide, YBCO, and $InO_2$, $SnO_2$, $RuO_2$ and $SrRuO_2$), whereby the partial layer could provide good contact to the underlying non-insulator while the material of the overlying continuous conductor would provide good adhesion or other desired physical properties.

For the preferred integrated circuit capacitor structures, the high dielectric insulator material is preferably chosen from barium titanate, strontium titanate, lead zirconium titanate, barium strontium titanate, lead lanthanum titanate, lead lanthanum zirconium titanate, lead manganese titanate with lead titanate, lead magnesium niobate with lead titanate, and other niobates, manganates and tantalates, while the partial, discontinuous layer is formed of a metal chosen from the group consisting of Pt, Pd, Au, Ag, Rh, Re, Ir, Os and Ru. Any of the listed metals will form a partial layer comprising an array of clusters prior to completely covering the surface of the dielectric. In addition, each of the listed metals provides a discrete interface with the high dielectric insulator materials, thereby providing the desired electrical properties for an integrated circuit capacitor.

The thickness of metal deposition for the partial layer is preferably less than 20 nm and ideally in the range of ~125–180 Å, in order to provide less than complete coverage of the underlying surface. As noted above, the thin film metal deposition process and deposition conditions can be chosen and tailored to optimize the deposition rate, cluster growth rate and coverage, and metal thickness. Coverage of from 50% to 92% of the insulator surface will provide a sufficient amount of metal to realize the desired capacitance without obtaining a spatially continuous layer of the metal. While electrical conductivity across the entire surface is not required of this partial layer, it is preferable that the deposition of the partial layer approach the percolation threshold to optimize the capacitance of the structure, as is discussed further below.

Subsequent to formation of the partial, discontinuous metal layer, a continuous layer of metal or other conducting material is deposited over the partial layer. The conducting material for the continuous layer is selected from a group of materials including Al, Cu, Ta, Ti, Nb, Ni, Mo, MoW, Sn, alloys of those metals, conducting oxides, conducting silicides and conducting nitrides. All of the materials for the continuous layer are chosen for their good adherence to the underlying insulator and some reactivity to the insulator, as well as for their conductivity. The contact between the partial layer and the continuous layer will, in general, be quite strong since alloying and interdiffusion may occur. In addition, the partial layer may serve as a partial seed layer for growth of the continuous layer if electrolytic deposition is utilized.

The thickness of the continuous layer may be in the range of 50–500 nm, sufficient to obtain a conformal layer over the exposed surface of the insulator and the partial metal layer. Selection of any one of the suggested materials for the continuous layer will depend upon the requirements of the end-product circuitry and the subsequent processing and conditions of use to which the material will be subjected. In some structures, it is optimal to have Al or Cu as the top surface metal to facilitate connection to successive layers of circuitry. In other structures, superconductive materials, such as the conducting oxides, will be preferred. What is necessary for all embodiments of the inventive structure is that the material of the continuous layer adhere to those areas of the underlying material which are exposed between the clusters of the partial layer.

Figure 2:
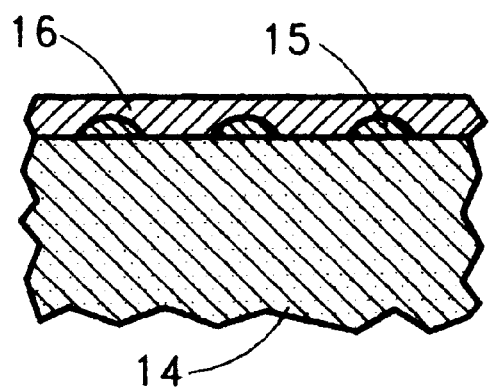
FIG. 2 illustrates a schematic cross-section of the inventive structure including a first partial metal layer and a second continuous conducting layer deposited on an underlying dielectric.

FIG. 2 provides a schematic cross-sectional view of an insulator material, 14, preferably chosen from the high dielectric materials listed above including barium titanate, strontium titanate, lead zirconium titanate, barium strontium titanate, lead lanthanum titanate, lead lanthanum zirconium titanate, lead manganese titanate with lead titanate, lead magnesium niobate with lead titanate, and other niobates, manganates and tantalates, onto which is deposited a partial metal layer comprised of clusters or islands or bumps, 15.

The partial layer, of a metal selected from Pt, Pd, Au, Ag, Rh, Re, Ir, Os and Ru, can be deposited in such a manner as to "grow" the clusters or islands, as occurs when the aforementioned controllable thin film deposition techniques are utilized. In the alternative, a continuous layer of the preferred metal may be deposited onto the insulator surface, followed by lithographic patterning or subtractive etching to expose part of the surface of the underlying insulator. Lithographic patterning, using electron beam or x-ray lithography, may require a patterned aperture mask for precise control of the partial metal pattern, and would be expected to produce a pattern of metal islands having relatively abrupt edges. Subtractive etching processes, including ion milling, reactive or non-reactive sputter etching, wet chemical etching, etc., would generally provide a less precise pattern of partial metal, which is adequate for the present invention provided that some of the underlying insulator surface is exposed and from about 50% to about 92% of the surface maintains an interface with the metal of the partial layer. The exact determination of the ratio of openings to metal at the interface may depend on the design needs of the end product circuitry. It is preferred that the areas of exposed insulator surface be uniformly distributed about the surface to maximize the adhesive integrity of the structure.

After the partial metal layer has been formed, either by a single deposition step or a series of deposition and removal steps, the continuous metal layer, 16, is deposited over the partial metal and exposed insulator surface. In the areas of exposed insulator surface between the clusters or islands of metal, 15, the material of the continuous conducting layer, 16, will directly contact the underlying dielectric material. Due to the fact that the material of the continuous conducting layer has been chosen from materials, including Al, Cu, Ta, Ti, Nb, Ni, Mo, MoW, Sn, alloys of those metals, conducting oxides, conducting suicides and conducting nitrides, which exhibit good adherence to the dielectric material, adhesion is observed at the areas of exposed dielectric between the clusters or bumps of partial metal.

The pockets of adhesion will provide the mechanical integrity of the partial layer-continuous layer electrode throughout subsequent processing and use. It has been observed that photoresist processing of fine features is enhanced due to the partial layer-continuous layer electrode proposed by the present invention. Whereas pure platinum features would peel during liftoff processes, the Pt—Al (or other partial layer-continuous layer electrode) features adhere well during such processing.

A surprising result of the inventive structure is that the total capacitance of the structure is high, even though a reactive (presumably, oxide-forming) conductor has been placed in contact with areas of the dielectric surface. Although areas comprising low dielectric constant oxides are introduced in those areas where the continuous layer material contacts the dielectric, in parallel with the high dielectric material interfaces, the total capacitance of the structure remains high. This phenomenon can be explained in part due to the interparticle or intercluster capacitance which is exhibited by a percolating metal film. Virtually the same capacitance can be realized in a partial layer of percolating metal and in its continuous counterpart layer. In addition, the irregular surface of the electrode at the interface effectively enlarges the surface area of the interface thereby providing increased capacitance. The enhanced capacitance has been observed to be greatest at or near the percolation threshold of the metal in the partial layer.

Figure 3A:
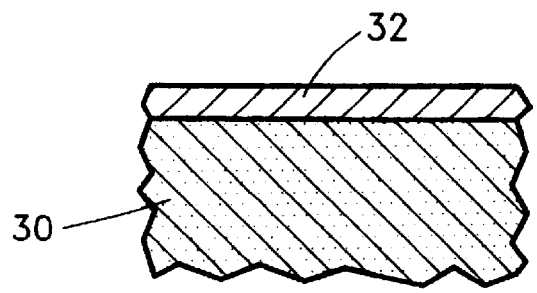
FIGS. 3A through 3C illustrate, in schematic cross-section, one sequence of steps for fabrication of the inventive capacitor structure.
Figure 3B:
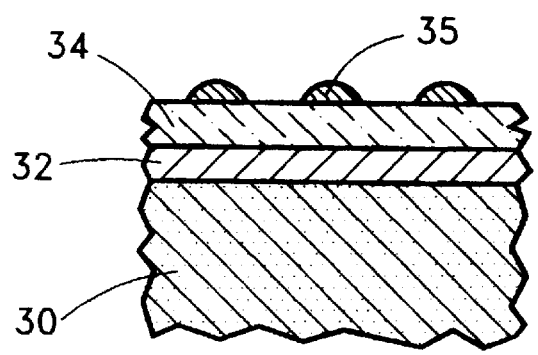
Figure 3C:
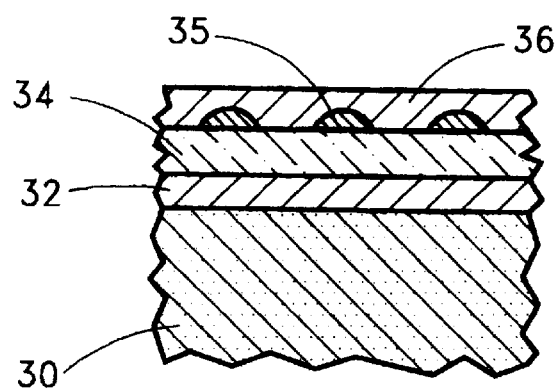

FIGS. 3A through 3C illustrate the steps of one preferred process flow for implementing the present invention. In forming a capacitor, a first continuous electrode, 32, is deposited onto a substrate, 30, as shown in FIG. 3A. A high dielectric high permittivity thin film, 34, is next deposited onto the first continuous electrode, followed by deposition of a partial layer of metal, 35, as illustrated in FIG. 3B. Finally, the continuous conducting layer, 36, is deposited contacting both the partial metal layer and the areas of exposed dielectric thin film to produce the structure of FIG. 3C. The conducting material of the continuous layer is then available for subsequent connection of the capacitor to additional levels of circuitry.

Figure 4:
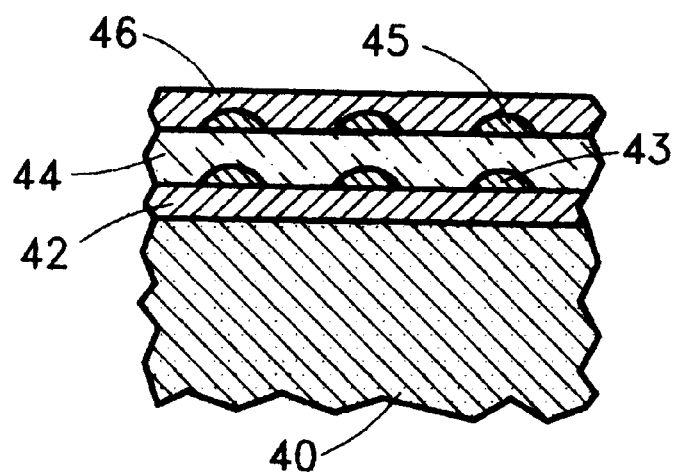
FIG. 4 provides a schematic illustration of a capacitor structure in accordance with one embodiment of the present invention.

To realize the adhesive benefits between the high permittivity thin film and both electrodes of a capacitor structure, partial metal layers can be provided at both the top and bottom surfaces of the thin film. FIG. 4 illustrates a capacitor structure having a first electrode comprising a first continuous conducting layer, 42, deposited on the substrate, 40, and a first partial metal layer, 43, deposited on the continuous conducting layer and exposing areas of the conducting material of the conducting layer. A high permittivity thin film, 44, overlays the first electrode, having electrically discrete interface areas in contact with the first partial metal layer, 43, and adherent areas where the thin film contacts the exposed conducting material. Over the thin film, 44, is deposited a second electrode comprising a second partial metal layer, 45, and second continuous metal layer 46. It is to be noted that the metal for the first and second partial layers, 43 and 45, need not be the same metal, but each metal layer is preferably selected from the group consisting of Pt, Pd, Au, Ag, Rh, Re, Ir, Os and Ru. Similarly, the conducting material for the first and second continuous layers need not be the same for layers 42 and 46; but, each is preferably selected from the group consisting of Al, Cu, Ta, Ti, Nb, Ni, Mo, MoW, Sn, alloys of those metals, conducting oxides, conducting silicides and conducting nitrides.

As described, the present invention teaches a structure and method for providing an interface with a surface wherein the interface exhibits both high adhesion and preferred electrical properties. The method involves providing a partial layer of a first material, chosen for its electrical properties, whereby the partial layer has openings through which areas of the surface are exposed. Provision of the partial layer is followed by deposition of a continuous layer of a second material, selected for its preferred physical interface properties, i.e., adhesion. The continuous layer of the second material is deposited over the partial layer including the exposed areas of the surface. The second material will adhere to the exposed areas of surface, while the first material will provide a discrete interface with the surface. While the present invention has been described with reference to several preferred materials and structures, modifications as will occur to one having skill in the art cannot be made without departing from the spirit and scope of the invention as set forth in the appended claims.

Having thus described our invention, what we claim as new and desire to secure by Letters Patent is:

1. A method for providing an adherent metal structure on a dielectric substrate comprising the steps of:

providing an incomplete layer of metal on the dielectric substrate whereby said incomplete layer of metal has openings exposing areas of said dielectric substrate; and depositing a layer of conducting material over said incomplete layer of metal and said openings, whereby no interfacial layer forms between said exposed dielectric substrate and said incomplete layer of metal and whereby any interfacial layer which may form between said conducting material and said exposed dielectric substrate does not compromise the electrical properties of the metal structure.

2. The method of claim 1 whereby said substrate comprises an oxide.

3. The method of claim 2 wherein said providing of said incomplete layer of metal comprises depositing said metal to a thickness greater than the thickness at which said incomplete layer of metal becomes conducting.

4. The method of claim 2 wherein said providing of said incomplete metal layer comprises the steps of:

depositing a complete layer of said metal on said oxide; and selectively removing said metal to expose areas of said oxide.

5. The method of claim 1 wherein said providing an adherent metal structure comprises forming an electrode for a capacitor structure and further comprises, prior to said providing the steps of:

forming a first electrode by the steps of: depositing a first layer of conducting material on said dielectric substrate and providing a partial first metal layer on said first layer of conducting material whereby said partial first metal layer has openings exposing areas of said first layer of conducting material;

depositing a thin film of high permittivity material over said partial first metal layer and said areas of exposed conducting material; and wherein said providing said incomplete layer comprises forming a second electrode by the steps of:

providing said incomplete layer by depositing a partial second metal layer on said thin film of high permittivity material, whereby said partial second metal layer has openings exposing areas of said thin film of high permittivity material; and depositing a layer of conducting material by depositing a second layer of conducting material over said partial second layer and said openings, whereby no interfacial layer forms between said exposed thin film of high permittivity material and said partial second metal layer and whereby any interfacial layer which may form between said conducting material and said exposed thin film of high permittivity material will not compromise the electrical properties of the metal structure.

6. The method of claim 5 wherein said depositing of said partial first and second metal layers comprises depositing each of said metals to a thickness greater than the thickness at which each of said partial first and said partial second metal layers become conducting.

7. The method of claim 5 wherein said providing of said partial first metal layer comprises the steps of:

depositing a complete layer of said metal on said conducting material; and selectively removing said metal to expose areas of said conducting material.

8. The method of claim 5 wherein said providing of said partial second metal layer comprises the steps of:

depositing a complete layer of said metal on said thin film; and selectively removing said metal to expose areas of said thin film.

\* \* \* \* \*